(12) United States Patent
Yoshida

(10) Patent No.: US 11,029,551 B2
(45) Date of Patent: Jun. 8, 2021

(54) LIGHT CONTROL DEVICE

(71) Applicant: TOPPAN PRINTING CO., LTD., Taito-ku (JP)

(72) Inventor: Tetsushi Yoshida, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 16/791,678

(22) Filed: Feb. 14, 2020

(65) Prior Publication Data

US 2020/0183204 A1   Jun. 11, 2020

Related U.S. Application Data

(63) Continuation of application No. PCT/JP2018/030341, filed on Aug. 15, 2018.

(30) Foreign Application Priority Data

Aug. 15, 2017  (JP) .............................. JP2017-156784

(51) Int. Cl.
*G02F 1/1334* (2006.01)
*G02F 1/1335* (2006.01)

(52) U.S. Cl.
CPC ...... *G02F 1/1334* (2013.01); *G02F 1/133528* (2013.01); *G02F 1/13347* (2021.01)

(58) Field of Classification Search
CPC .................................................. G02F 1/1334
See application file for complete search history.

(56) References Cited

U.S. PATENT DOCUMENTS

| 2006/0152649 A1 | 7/2006 | Yanagida |
| 2007/0218216 A1 | 9/2007 | Kato et al. |
| 2015/0109547 A1* | 4/2015 | Kim ................ G02F 1/133528 349/12 |
| 2018/0031875 A1* | 2/2018 | Qin ................... G02B 6/0036 |

(Continued)

FOREIGN PATENT DOCUMENTS

| JP | 04-212928 A | 8/1992 |
| JP | 06-67162 A | 3/1994 |
| JP | 08-320470 A | 12/1996 |

(Continued)

OTHER PUBLICATIONS

Extended European Search Report dated Jul. 9, 2020 in Patent Application No. 18846080.2, citing document AA therein, 11 pages.

(Continued)

*Primary Examiner* — James A Dudek
(74) *Attorney, Agent, or Firm* — Oblon, McClelland, Maier & Neustadt, L.L.P.

(57) ABSTRACT

A light control device including a first transparent electrode, a second transparent electrode, a light control layer sandwiched vertically between the first transparent electrode and the second transparent electrode and including a polymer network in which domains each filled with a liquid crystal composition are dispersed, and a pair of polarizing layers sandwiching the light control layer and positioned in a crossed Nicols relationship. The liquid crystal composition includes liquid crystal molecules that change to a vertical orientation upon application of a driving voltage to the light control layer.

20 Claims, 2 Drawing Sheets

(56) References Cited

U.S. PATENT DOCUMENTS

2019/0377207 A1* 12/2019 Zhou .................. C09K 19/544
2020/0057322 A1*  2/2020 Zhou ...................... E06B 9/24

FOREIGN PATENT DOCUMENTS

| JP | 2006-162823 A | 6/2006 |
| JP | 2007-249041 A | 9/2007 |
| WO | WO 2017/057619 A1 | 4/2017 |

OTHER PUBLICATIONS

International Search Report dated Nov. 6, 2018 in PCT/JP2018/030341, filed Aug. 15, 2018, citing documents AA and AP-AT therein (with English Translation).

* cited by examiner

LIGHT CONTROL DEVICE

CROSS-REFERENCE TO RELATED APPLICATIONS

The present application is a continuation of International Application No. PCT/JP2018/030341, filed Aug. 15, 2018, which is based upon and claims the benefits of priority to Japanese Application No. 2017-156784, filed Aug. 15, 2017. The entire contents of all of the above applications are incorporated herein by reference.

BACKGROUND OF THE INVENTION

Field of the Invention

The present invention relates to a light control device.

Discussion of the Background

There are known light control devices that are provided with a light control layer containing polymer network liquid crystal. Such light control devices include a pair of transparent substrates, a pair of transparent electrodes sandwiched between the pair of transparent substrates, and a light control layer disposed between the transparent electrodes. The light control layer contains a polymer network having a three-dimensional mesh, and a liquid crystal composition provided in a plurality of domains which are defined by the polymer network. In such a light control device, the light control layer has light transmittance that is different between when a driving voltage is applied to the light control device and when no driving voltage is applied thereto (e.g., see JP 2006-162823 A). The mainstream mode of light control devices using liquid crystal has been a normal mode in which the device is opaque when no driving voltage is applied thereto but is transparent when a driving voltage is applied thereto. Recently, however, practical use of a reverse mode is being considered. In the reverse mode, the device is transparent when no driving voltage is applied thereto but is opaque when a driving voltage is applied thereto.

SUMMARY OF THE INVENTION

According to an aspect of the present invention, a light control device includes a first transparent electrode, a second transparent electrode, a light control layer sandwiched vertically between the first transparent electrode and the second transparent electrode and including a polymer network in which domains each filled with a liquid crystal composition are dispersed, and a pair of polarizing layers sandwiching the light control layer and positioned in a crossed Nicols relationship. The liquid crystal composition includes liquid crystal molecules that change to a vertical orientation upon application of a driving voltage to the light control layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
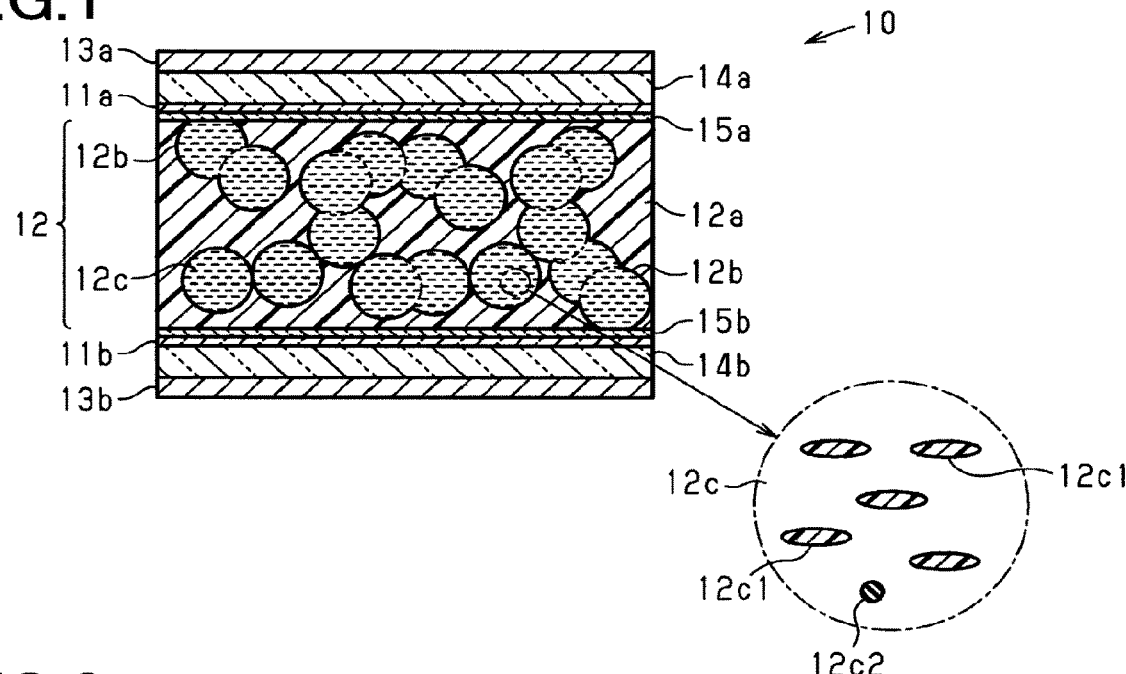
FIG. 1 is a schematic cross-sectional view illustrating a configuration of a light control device when no driving voltage is applied to the device, according to a first embodiment.

The embodiments will now be described with reference to the accompanying drawings, wherein like reference numerals designate corresponding or identical elements throughout the various drawings.

First Embodiment

Figure 2:
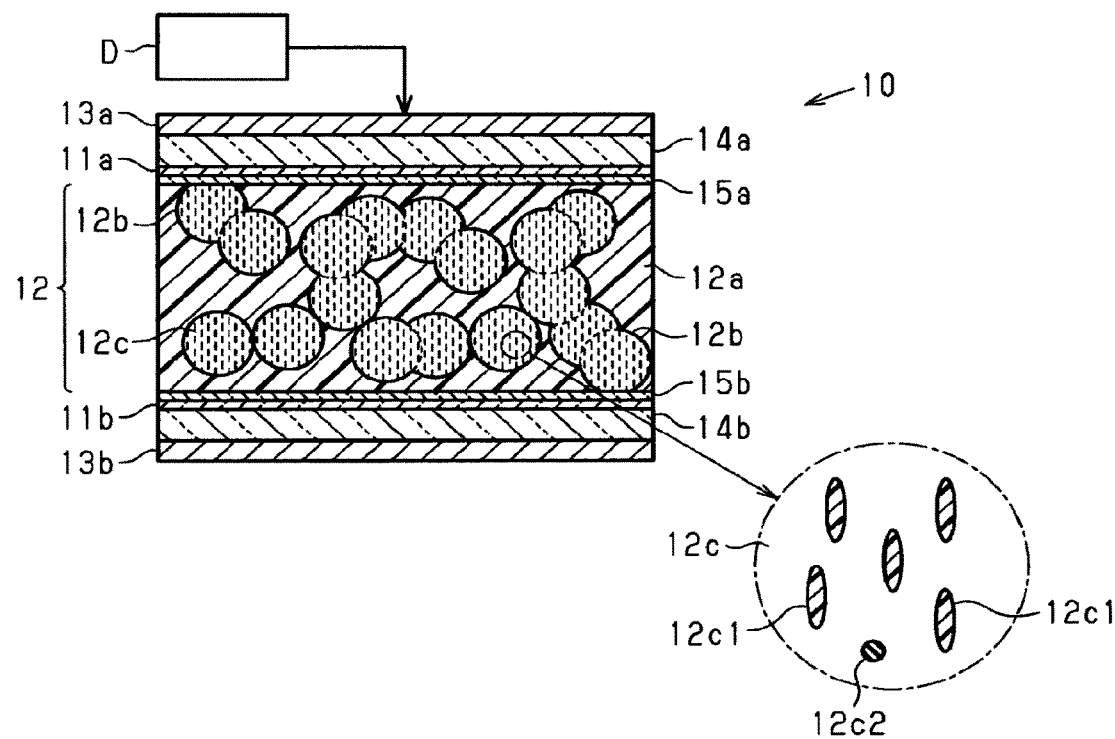
FIG. 2 is a schematic cross-sectional view illustrating a configuration of the light control device when a driving voltage is applied to the device, according to the first embodiment.

Referring to FIGS. 1 and 2, a first embodiment of a light control device will be described. FIG. 1 shows a state in which no driving voltage is applied to a light control layer provided to the light control device. FIG. 2 shows a state in which a driving voltage is applied to the light control layer. In FIGS. 1 and 2, domains contained in the light control layer are exaggerated for ease of explaining the configuration of the light control layer. In the following description, configuration and advantageous effects of the light control device will be sequentially explained.

(Configuration of the Light Control Device)

Referring to FIG. 1, a configuration of the light control device will be described.

As shown in FIG. 1, a light control device 10 includes a first transparent electrode 11a, a second transparent electrode 11b, a light control layer 12 and a pair of polarizing layers 13a and 13b. The light control layer 12 is sandwiched between the first and second transparent electrodes 11a and 11b. The light control layer 12 contains a polymer network 12a and a plurality of domains 12b dispersed in the polymer network 12a. The domains 12b are each filled with a liquid crystal composition 12c. This configuration is generally referred to as a polymer network liquid crystal system.

The pair of polarizing layers sandwich the light control layer 12. Of the pair of polarizing layers, the polarizing layer disposed facing away from the light control layer 12 via the first transparent electrode 11a is the first polarizing layer 13a. Similarly, the polarizing layer disposed facing away from the light control layer 12 via the second transparent electrode 11b is the second polarizing layer 13b. The first and second polarizing layers 13a and 13b are arranged in a crossed Nicols relationship. The first and second polarizing layers 13a and 13b sandwich therebetween the first and second transparent electrodes 11a and 11b, and the light control layer 12.

The liquid crystal composition 12c contains liquid crystal molecules 12c1. When a driving voltage is applied to the light control layer 12, the orientation of the liquid crystal molecules 12c1 changes to a vertical orientation. Specifically, the orientation of the liquid crystal molecules 12c1 contained in the liquid crystal composition 12c is an orientation other than a vertical orientation in a state in which no driving voltage is applied to the light control layer 12. By applying a driving voltage to the light control layer 12, the orientation changes to a vertical orientation. It should be noted that the orientation of the liquid crystal molecules 12c1 in a state in which no driving voltage is applied to the light control layer 12 is the initial orientation. The initial orientation of the liquid crystal molecules 12c1 is a horizontal orientation or a twisted orientation.

Among the domains 12b, those which are adjacent to each other are connected to each other. Thus, when a driving voltage is applied, each domain 12b changes the orientation of the liquid crystal molecules 12c1 filled therein in conjunction with other domains 12b. When one of the plurality of domains 12b is selected for estimation of the size thereof, size fitting is performed for this domain 12b by using a phantom circle through image analysis.

The initial orientation being horizontal or twisted can reduce or prevent light scattering in the light control layer 12, resultantly reducing turbidity of the light control device 10, i.e., haze of the light control device 10, when no driving voltage is applied to the light control layer 12.

The light control device 10 further includes a pair of transparent substrates 14a and 14b, and a pair of orientation layers 15a and 15b. Of the pair of transparent substrates 14a and 14b, the transparent substrate disposed between the first transparent electrode 11a and the first polarizing layer 13a is the first transparent substrate 14a. Similarly, the transparent substrate disposed between the second transparent electrode 11b and the second polarizing layer 13b is the second transparent substrate 14b. Of the pair of orientation layers 15a and 15b, the orientation layer disposed between the first transparent electrode 11a and the light control layer 12 is the first orientation layer 15a. Similarly, the orientation layer disposed between the second transparent electrode 11b and the light control layer 12 is the second orientation layer 15b. The individual layers of the light control device 10 will be more specifically explained below.

At least any one of the plurality of domains 12b is in contact with the first orientation layer 15a or the second orientation layer 15b. The liquid crystal composition 12c in the domains 12b has been phase-separated from the polymer network 12a. Furthermore, the liquid crystal composition 12c in each domain 12b is continuous with the liquid crystal composition 12c in other domains 12b. Therefore, the liquid crystal molecules 12c1 in all the domains 12b have an initial orientation that has been controlled by the orientation layers. As mentioned above, the initial orientation of the liquid crystal molecules 12c1 is a horizontal orientation or a twisted orientation.

(Transparent Substrates)

The first and second transparent substrates 14a and 14b have optical transparency and transmit visible light. Resin films may be used for the first and second transparent substrates 14a and 14b. For example, the material that can be used for the resin films may be polycarbonate, polyvinyl chloride, polyvinyl alcohol, polyethylene terephthalate, or the like. Alternatively, glass substrates may be used for the first and second transparent substrates 14a and 14b.

(Transparent Electrodes)

The first and second transparent electrodes 11a and 11b have optical transparency and transmit visible light. The material that can be used for the first and second transparent electrodes 11a and 11b may be any of a metal oxide, organic polymer, metal nanowires and carbon nanotubes (CNT). For example, the metal oxide may be indium tin oxide (ITO), tin oxide (TO), zinc oxide (ZnO), fluorine-doped tin oxide (FTO), or the like. The organic polymer may be a polymer having both optical transparency and electrical conductivity. Metal nanowires and carbon nanotubes have both optical transparency and electrical conductivity. Therefore, metal nanowires or carbon nanotubes may be used for the first and second transparent electrodes 11a and 11b.

(Polarizing Layers)

As mentioned above, the first and second polarizing layers 13a and 13b are arranged in a crossed Nicols relationship. Specifically, as viewed in the thickness direction of the light control device 10, the transmission axis of the first polarizing layer 13a extends in a direction perpendicular to the direction in which the transmission axis of the second polarizing layer 13b extends. For example, the polarizing layers 13a and 13b may each be formed by allowing a polyvinyl alcohol film or a polyethylene terephthalate film to adsorb a dichroic dye and then stretching the dye-adsorbed film in a predetermined direction. The dichroic dye maybe a dye that contains iodine, an organic dye, or the like. In the films forming the first and second polarizing layers 13a and 13b, the stretch directions are perpendicular to each other.

(Orientation Films)

The pair of orientation layers 15a and 15b have optical transparency and transmit visible light. Either of the following two examples can be selected for the pair of orientation layers 15a and 15b according to the initial orientation of the liquid crystal molecules 12c1. In a first example of the pair of orientation layers 15a and 15b, both of the first and second orientation layers 15a and 15b are horizontal orientation layers. Specifically, these orientation layers each have orientation regulation force orienting the liquid crystal molecules 12c1 such that the long axes of the liquid crystal molecules 12c1 become parallel to the plane where the orientation layer 15a or 15b extends. Moreover, the orientation layers have orientation regulation force allowing the axes of the liquid crystal molecules 12c1, which are to be oriented by the orientation layers, to be parallel to each other. According to such a pair of orientation layers 15a and 15b, the initial orientation of the liquid crystal molecules 12c1 can be a horizontal orientation. It should be noted that a horizontal orientation is also referred to as a homogeneous orientation. Furthermore, the pair of orientation layers 15a and 15b allow the liquid crystal molecules 12c1 to orient such that, as viewed in the thickness direction of the light control device 10, the direction in which the long axes of the liquid crystal molecules 12c1 extend intersects the direction in which the transmission axes of the polarizing layers 13a and 13b extend, forming an angle 450 therebetween.

In a second example of the pair of orientation layers 15a and 15b, similar to the first example, both of the first and second orientation layers 15a and 15b are horizontal orientation layers. Specifically, the orientation layers 15a and 15b each have orientation regulation force orienting the liquid crystal molecules 12c1 such that the long axes of the liquid crystal molecules 12c1 become parallel to the plane where the orientation layer 15a or 15b extends. However, the first orientation layer 15a has orientation regulation force allowing the long axes of the liquid crystal molecule 12c1 to be parallel to the direction in which the transmission axis of the first polarizing layer 13a extends. The second orientation layer 15b has orientation regulation force allowing the long axes of the liquid crystal molecule 12c1 to be parallel to the direction in which the transmission axis of the second polarizing layer 13b extends. According to such a pair of orientation layers, the initial orientation of the liquid crystal molecules 12c1 can be a twisted orientation.

For example, the orientation layers 15a and 15b may be formed by the following method. First, polyimide films are prepared. Then, a surface of each film to be in contact with the light control layer 12 of the light control device 10 is subjected to a rubbing treatment suitable for the initial orientation of the liquid crystal molecules 12c1. Thus, a pair of orientation layers 15a and 15b can be obtained. The orientation layers 15a and 15b may be embodied by photo-orientation layers exerting predetermined orientation regulation force by light irradiation.

(Light Control Layer)

(Liquid Crystal Composition)

The liquid crystal composition 12c contains liquid crystal molecules 12c1. The liquid crystal composition 12c may contain or may not contain an unreacted part (unpolymerized part) of a UV-polymerizable compound 12c2 used for forming the polymer network 12a. The liquid crystal composition 12c may desirably have high chemical stability to light. The liquid crystal molecules 12c1 may be liquid crystal molecules which have a nematic liquid crystal phase and a positive dielectric anisotropy, irrespective of the initial orientation of the liquid crystal molecules.

By using such liquid crystal molecules having a nematic liquid crystal phase and a positive dielectric anisotropy as the liquid crystal molecules 12c1 and by applying a driving voltage to the light control layer 12, the orientation of the liquid crystal molecules 12c1 changes from a horizontal orientation to a vertical orientation, or from a twisted orientation to a vertical orientation.

(Polymer Network)

The material for forming the polymer network 12a may be a UV-polymerizable compound 12c2. The UV-polymerizable compound 12c2 polymerizes with another UV-polymerizable compound 12c2 by application of UV light to thereby form a polymer network 12a. The polymer network 12a may contain optically isotropic polymer molecules, i.e., an optically isotropic polymer, or may contain liquid crystal polymer molecules, i.e. a liquid crystal polymer. In other words, the UV-polymerizable compound 12c2 may be an optically isotropic compound or may be a compound containing liquid crystal molecules.

The optically isotropic compound may be a monofunctional UV-polymerizable compound, a bifunctional UV-polymerizable compound or a polyfunctional UV-polymerizable compound. Examples of the monofunctional UV-polymerizable compound include acrylate compounds, methacrylate compounds and oligomers of these compounds. Examples of the acrylate compound include butyl ethyl acrylate and cyclohexyl acrylate. Examples of the methacrylate compound include N,N-dimethylaminoethyl methacrylate and phenoxyethyl methacrylate.

Examples of the bifunctional UV-polymerizable compound include stilbene compounds, diacrylate compounds, dimethacrylate compounds and oligomers of these compounds. Examples of the polyfunctional UV-polymerizable compound include triacrylate compounds, tetraacrylate compounds, trimethacrylate compounds, tetramethacrylate compounds and oligomers of these compounds.

In a configuration in which the polymer network 12a contains an optically isotropic polymer and the liquid crystal molecules 12c1 are in the initial orientation, the polymer is preferred to have a refractive index that is substantially equal to an average refractive index of the liquid crystal molecules 12c1. It should be noted that the average refractive index of the liquid crystal molecules 12c1 is obtained by averaging the extraordinary refractive index and the ordinary refractive index in double refraction of the liquid crystal molecules 12c1.

To promote formation of the polymer network 12a, the liquid crystal composition 12c may contain a polymerization initiator that generates radicals by application of UV light.

The UV-polymerizable compound 12c2 may contain one or more compounds mentioned above.

The compound containing liquid crystal molecules may be a mesogenic compound. The mesogenic compound contains a mesogenic group having a rod or plate shape and containing aromatic ring. The mesogenic group is contained in at least either of the main chain and the side chain of the mesogenic compound. Use of a mesogenic compound containing the mesogenic group only in the main chain can produce a main-chain liquid crystal polymer. Use of a mesogenic compound containing the mesogenic group only in the side chain can produce a side-chain liquid crystal polymer. Furthermore, use of a mesogenic compound containing the mesogenic group in both the main and side chains can produce a composite liquid crystal polymer.

In the liquid crystal polymer contained in the polymer network 12a, the orientation of a unit structure, i.e., the structure for the liquid crystal molecules before polymerization, for forming the polymer is fixed to the orientation determined by the orientation regulation force of the orientation layers 15a and 15b. Therefore, when the pair of orientation layers 15a and 15b are formed such that the liquid crystal molecules 12c1 filled in the domains 12b are horizontally oriented, the orientation of the unit structure contained in the polymer network 12a, i.e., the orientation of the structure of the liquid crystal molecules, is fixed to a horizontal orientation. When the pair of orientation layers 15a and 15b are formed such that the liquid crystal molecules 12c1 are oriented in a twisted orientation, the orientation of the unit structure contained in the polymer network 12a is fixed to a twisted orientation.

In the light control layer 12, the surface contacting the first orientation layer 15a is a front surface, and the surface contacting the second orientation layer 15b is a back surface. On the front and back surfaces of the light control layer 12, the length of the region occupied by each domain 12b contained in the polymer network 12a is a domain diameter of the domain 12b. The length of the region occupied by each domain 12b corresponds to the diameter of the domain 12b that is defined by a phantom circle as a result of image analysis thereof. For example, the average domain diameter may be 0.1 $\mu$m or more and 5 $\mu$m or less, more preferably 0.2 $\mu$m or more and 3 $\mu$m or less, and even more preferably 0.5 $\mu$m or more and 2 $\mu$m or less.

For example, in the domains 12b dispersed in the polymer network 12a, 30% or more, preferably 50% or more, and even more preferably 80% or more of the domains 12b may have substantially an equal diameter. It should be noted that when one of two domains 12b has a diameter that is ±50% of the other, the diameters of these two domains 12b are regarded to be equal. According to such a configuration, domains 12b with high uniformity in domain diameter are dispersed in the polymer network 12a. Therefore, light incident on the light control layer 12 is prevented from being scattered in the light control layer 12. Therefore, for example, a configuration allowing the light control device 10 to present a black color by application of a driving voltage may minimize increase in brightness of the black color presented by the light control device 10. As a result, vividness of the black color presented by the light control device 10 is enhanced.

Such a light control layer 12 is preferred to have a refractive index anisotropy of 0.1 or less during application of a driving voltage thereto. The refractive index anisotropy of the light control layer 12 is determined by the refractive index of the polymer network 12a contained in the light control layer 12 and the refractive index of the liquid crystal composition 12c. If the refractive index anisotropy is 0.1 or less, light incident on the light control layer 12 is prevented from being scattered therein. Thus, for example, while the light control device 10 presents a black color, increase in brightness of the light control layer 12 is minimized, or in other words the color presented by the light control device 10 is prevented from becoming approximate to gray. As a result, the black color presented by the light control device 10 may have even higher vividness.

It is preferred that, during application of a driving voltage to the light control layer 12, i.e., during application of a driving voltage to the light control device 10, the refractive index of the polymer network 12a, the extraordinary refractive index of the liquid crystal molecules 12c1 and the ordinary refractive index of the liquid crystal molecules 12c1 have a maximum value and a minimum value with a difference of 0.16 or less therebetween. If the difference between the maximum and minimum values of the refractive indices mentioned above is 0.16 or less during application of a driving voltage to the light control layer 12, the difference between the maximum and minimum values of the refractive indices is also 0.16 or less when no driving voltage is applied to the light control layer 12.

Scattering of light incident on the light control layer 12 can also be minimized by reducing the difference in refractive index between the polymer network 12a and the liquid crystal molecules 12c1 filled in the domains 12b that are defined by the polymer network 12a. This may minimize light leakage from the light control layer 12 to the outside thereof. In this regard, light scattering in the light control layer 12 can be minimized by permitting the difference between maximum and minimum values to be 0.16 or less in the refractive index of the polymer network 12a, the extraordinary refractive index of the liquid crystal molecules 12c1 and the ordinary refractive index of the liquid crystal molecules 12c1. As a result, vividness of the color presented by the light control device 10 can be even more enhanced.

In the light control layer 12, the mass of a substance derived from the UV-polymerizable compound 12c2 relative to the total mass of the light control layer 12 may, for example, be 5 mass % or more and 50 mass % or less. The substance derived from the UV-polymerizable compound 12c2 contains a single UV-polymerizable compound 12c2 and a polymer formed by irradiating the UV-polymerizable compound 12c2 with UV light. The ratio of the mass of the substance derived from the UV-polymerizable compound 12c2 relative to the total mass of the light control layer 12 may be regarded to be equal to the ratio of the UV-polymerizable compound 12c2 relative to the mass of all the solid components of the light control layer 12 when it is produced.

According to such a configuration, adhesion of the light control layer 12 to the orientation layers 15a and 15b can be enhanced so as to prevent separation of the light control layer 12 from the orientation layers 15a and 15b when forming the light control layer 12, compared to the configuration in which the mass of the substance derived from the UV-polymerizable compound 12c2 is smaller. Furthermore, compared to the configuration in which the mass of the substance derived from the UV-polymerizable compound 12c2 is larger, light incident on the light control layer 12 is prevented from scattering in the polymer network 12a in a state in which no driving voltage is applied to the light control layer 12. Thus, turbidity in the light control device 10 can be minimized.

The light control layer 12 is preferred to have a thickness that is determined so as to satisfy the following formulas in a state in which no driving voltage is applied to the light control layer 12, in a configuration where the initial orientation of the liquid crystal molecules 12c1 is a horizontal orientation or a twisted orientation.

$$m\lambda = \Delta nd = (n_e - n_o)d \quad (1)$$

$$\lambda/2 = \Delta nd \quad (2)$$

In these formulas, m is an integer, $\lambda$ is a wavelength of light incident on the light control layer 12, $n_e$ is an extraordinary refractive index, $n_o$ is an ordinary refractive index, and d is a thickness of the light control layer 12. When the initial orientation of the liquid crystal molecules 12c1 is a twisted orientation and Formula (1) is satisfied, the intensity of transmitted light in the light control layer 12 is maximized. When the initial orientation of the liquid crystal molecules 12c1 is a horizontal orientation and Formula (2) is satisfied, the intensity of transmitted light in the light control layer 12 is maximized.

When no driving voltage is applied to the light control layer 12 as well, $\Delta n$, i.e., a value obtained by subtracting the ordinary refractive index $n_o$ from the extraordinary refractive index $n_e$, is preferred to be 0.16 or less as mentioned above. Thus, as is apparent from Formulas (1) and (2), $m\lambda$ at the time when the thickness d of the light control layer 12 varies, or variation in the value of $\lambda/2$, can be reduced, compared to the case where the value of $\Delta n$ is larger. Thus, the characteristics of the light control device 10 are unlikely to be varied due to the variation in the thickness d of the light control layer 12 when producing the light control device 10.

As the liquid crystal molecules 12c1 have a larger value of $\Delta n$, wavelength dispersion increases accordingly. In this regard, visible light applied to the light control device 10 has a predetermined wavelength region width, e.g., a wavelength region width of 450 nm or more and 610 nm or less. If the liquid crystal molecules 12c1 have a larger value of $\Delta n$, the wavelength dispersion increases accordingly. Therefore, polarization state may vary according to the wavelength of visible light, which may lead to color temperature variation. Such color temperature variation is likely to be affected by variation in the thickness d of the light control layer 12 as the value of $\Delta n$ increases. From this viewpoint as well, $\Delta n$ may preferably be 0.16 or less.

To obtain $\Delta n$ of 0.16 or less, it is preferred that liquid crystal molecules other than tolan-, biphenyl- and terphenyl-based liquid crystal molecules are used as the liquid crystal molecules. If tolan-, biphenyl- or terphenyl-based liquid crystal molecules are contained, the ratio of these liquid crystal molecules relative to the total liquid crystal molecules is preferred to be made smaller.

If $\Delta n$ is more than 0.16, the extraordinary refractive index $n_e$ becomes higher compared to the case of $\Delta n$ being 0.16 or less. Therefore, when the light control device 10 is observed obliquely, the difference in refractive index between the polymer network 12a and the liquid crystal molecules 12c1 increases even more. Thus, when no driving voltage is applied to the light control layer 12, transmittance according to the variation in viewing angle for observing the light control device 10 is lowered even more. From this viewpoint as well, $\Delta n$ is preferred to be 0.16 or less.

(Operation of the Light Control Device)

Referring to FIGS. 1 and 2, operation of the light control device 10 will be described The following description firstly explains a configuration in which the initial orientation of the liquid crystal molecules 12c1 is a horizontal orientation and secondly explains a configuration in which the initial orientation of the liquid crystal molecules 12c1 is a twisted orientation As will be explained below, the light control device 10 is a reverse-mode light control device which is transparent when no driving voltage is applied to the light control layer 12 but is opaque when a driving voltage is applied thereto.

As shown in FIG. 1, in the configuration in which the initial orientation is a horizontal orientation, the orientation of the liquid crystal molecules 12c1 contained in the liquid crystal composition 12c is a horizontal orientation when no driving voltage is applied to the light control layer 12. Therefore, for example, light incident on the light control layer 12 via the second polarizing layer 13b passes through the light control layer 12 and emerges from the light control device 10 via the first polarizing layer 13a. When no driving voltage is applied to the light control layer 12, the light control device 10 is transparent.

In a configuration in which the polymer network 12a contains a liquid crystal polymer, when no driving voltage is applied to the light control layer 12, the liquid crystal molecules 12c1 contained in the liquid crystal composition 12c and the liquid crystal polymer in the polymer network 12a are both in a horizontal orientation. Furthermore, scattering may be suppressed in the light control layer 12 by reducing or preventing increase of difference in extraordinary or ordinary refractive index between the liquid crystal molecules 12c1 and the liquid crystal polymer.

As shown in FIG. 2, when a drive section D applies a driving voltage to the light control layer 12 via the pair of transparent electrodes 11a and 11b, the long axis direction of the individual liquid crystal molecules 12c1 becomes parallel to the electric field to change the orientation of the liquid crystal molecules 12c1 from the horizontal orientation to a vertical orientation. Thus, for example, light incident on the light control layer 12 via the second polarizing layer 13b does not pass through the first polarizing layer 13a. Accordingly, the light control device 10 presents a black color. In this way, in the light control device 10, the vertically oriented liquid crystal molecules 12c1 are sandwiched between the two polarizing layers that are in a crossed Nicols relationship. Therefore, the light incident on the light control layer 12 via one polarizing layer does not emerge from the other polarizing layer. Therefore, transmittance can be efficiently lowered when a driving voltage is applied to the light control layer 12. Furthermore, transmittance can be controlled over a greater range between when no driving voltage is applied to the light control layer 12 and when a driving voltage is applied thereto. It should be noted that, in a configuration in which the light control device 10 presents a black color by application of a driving voltage, vividness of the black color presented by the light control device 10 is enhanced.

If a liquid crystal polymer is contained in the polymer network 12a, the orientation of the liquid crystal polymer is maintained to be the horizontal orientation when a driving voltage is applied to the light control layer 12. Therefore, there is a difference in extraordinary or ordinary refractive index between the liquid crystal molecules 12c1 and the liquid crystal polymer. In this regard, as mentioned above, if the mass of the substance derived from the UV-polymerizable compound 12c2 is 50% or less relative to the total mass of the light control layer 12, the extraordinary or ordinary refractive index of the liquid crystal polymer is prevented from affecting the extraordinary or ordinary refractive index of the light control layer 12. Therefore, scattering in the light control layer 12 due to such a difference in refractive index is reduced or prevented. This may resultantly minimize increase in brightness of the color presented by the light control device 10.

As shown in FIGS. 1 and 2, in a configuration in which the initial orientation is a horizontal orientation and the polymer network 12a contains an optically isotropic polymer, the optical control device 10 is transparent when no driving voltage is applied to the light control layer 12 but presents a black color, for example, when a driving voltage is applied thereto. However, while the orientation of the liquid crystal molecules 12c1 is a horizontal orientation when no driving voltage is applied to the light control layer 12, the orientation of the optically isotropic polymer is random. Therefore, light incident on the light control layer 12 is likely to be scattered therein compared to the configuration in which the polymer network 12a contains a liquid crystal polymer. In this regard, as mentioned above, if the mass of the substance derived from the UV-polymerizable compound 12c2 is 50% or less relative to the total mass of the light control layer 12, light intensity of scattered light occurring in the light control layer 12 can be lowered such that increase in brightness of the black color presented by the light control device 10 is minimized.

In a configuration in which the polymer network 12a contains an optically isotropic polymer, the polymer has no anisotropy in refractive index. Therefore, while the initial orientation of the liquid crystal molecules 12c1 changes to a vertical orientation, the refractive indices of the liquid crystal molecules 12c1 and the polymer are both prevented from excessively increasing.

Furthermore, as shown in FIG. 1, in a configuration in which the initial orientation is a twisted orientation, when no driving voltage is applied to the light control layer 12, the direction of polarized light, for example, incident on the light control layer 12 via the second polarizing layer 13b is twisted by 90° toward the first polarizing layer 13a due to the polarized light passing through the liquid crystal molecules 12c1 Therefore, light incident on the light control layer 12 via the second polarizing layer 13b emerges from the light control device 10 via the first polarizing layer 13a. Thus, when no driving voltage is applied to the light control layer 12, the light control device 10 is transparent.

As shown in FIG. 2, when the drive section D applies a driving voltage to the light control layer 12 via the pair of transparent electrodes 11a and 11b, the orientation of the liquid crystal molecules 12c1 changes to a vertical orientation as in the configuration explained above. Thus, for example, light incident on the light control layer 12 via the second polarizing layer 13b does not pass through the first polarizing layer 13a. Accordingly, for example, the light control device 10 presents a black color. It should be noted that, in a configuration in which the polymer network 12a contains a liquid crystal polymer, the orientation of the liquid crystal polymer is a twisted orientation even when a driving voltage is applied to the light control layer 12. Therefore, a residual phase difference is determined so that most of the polarized light incident on the light control layer 12 passes through the light control layer 12 without being twisted therein. Thus, increase in brightness of the black color presented by the light control device 10 is minimized. For example, when the refractive index difference of a liquid crystal polymer is $\Delta n$, the thickness of the light control layer 12 is d and the ratio of the liquid crystal molecules is r, the following Formula (3) is preferred to be satisfied, and the following Formula (4) is more preferred to be satisfied.

$$\Delta ndr \leq 0.25 \tag{3}$$

$$\Delta ndr \leq 0.1 \tag{4}$$

The light control device 10 is required to present a black color to enhance visual effects of an item at which the light control device 10 is set up, or to minimize visibility from one side to the other side of the light control device 10 in a space sectioned by the light control device 10. In addition, the light control device 10 is required to be capable of presenting a vivid black color, i.e., a black color with low brightness to enhance the black quality of the light control device 10. The light control device 10 of the present embodiment can satisfy these requirements.

As described above, according to the first embodiment of the light control device, the following advantageous effects can be achieved.

(1) In the light control device 10, when a driving voltage is applied to the light control layer 12, the vertically oriented liquid crystal molecules 12c1 are sandwiched between the two polarizing layers 13a and 13b that are in a crossed Nicols relationship. Therefore, light incident on the light control layer 12 via one polarizing layer does not emerge from the other polarizing layer. Therefore, transmittance can be effectively lowered when a driving voltage is applied to the light control layer 12. Furthermore, transmittance can be controlled over a greater range between when no driving voltage is applied to the light control layer 12 and when a driving voltage is applied thereto.

(2) In a configuration in which the polymer network 12a contains a liquid crystal polymer and the liquid crystal molecules 12c1 are in the initial orientation, the orientation direction of the liquid crystal molecules 12c1 and that of the liquid crystal polymer become equal to each other. Therefore, increase of difference in extraordinary refractive index or ordinary refractive index is minimized between the liquid crystal molecules 12c1 and the liquid crystal polymer. Therefore, light scattering is minimized in the light control layer 12. As a result, turbidity of the light control device 10 is lowered.

(3) In a configuration in which the polymer network 12a contains an optically isotropic polymer, the polymer has no anisotropy in refractive index. Therefore, while the initial orientation of the liquid crystal molecules 12c1 changes to a vertical orientation, the refractive indices of the liquid crystal molecules 12c1 and the polymer are both prevented from excessively increasing.

(4) The initial orientation being a horizontal or twisted orientation can reduce or prevent light scattering in the light control layer 12, resultantly reducing turbidity of the light control device 10.

(5) The refractive index anisotropy being 0.1 or less can prevent light incident on the light control layer 12 from being scattered therein. Thus, when the light control device 10 is in a black color, for example, increase in brightness of the light control layer 12 is minimized, or in other words the color presented by the light control device 10 is prevented from approaching a gray color. Consequently, vividness of the black color presented by the light control device 10 can be enhanced.

(6) Light scattering in the light control layer 12 can be minimized by permitting the difference between maximum and minimum values to be 0.16 or less among the refractive index of the polymer network and the extraordinary and ordinary indices of the liquid crystal molecules. As a result, vividness of the color presented by the light control device 10 can be even more enhanced. By permitting the difference between maximum and minimum values to be 0.16 or less among these refractive indices, good visibility can be obtained in oblique observation of the light control layer 12 when no driving voltage is applied thereto. The expression "oblique observation of the light control layer 12" refers to observing the light control layer 12 in a direction inclined relative to the direction normal to the light control layer 12.

The first embodiment described above may be implemented by being appropriately modified as follows.

At least one of the polarizing layers 13a and 13b may be placed between the transparent electrode and the transparent substrate. Such a configuration can achieve advantageous effects similar to Item (1) provided above as long as the pair of polarizing layers 13a and 13b are arranged in a crossed Nicols relationship and sandwich the light control layer 12 containing the liquid crystal molecules 12c1.

In the above embodiment, the light control device 10 is explained as presenting a black color when a voltage is applied to the light control layer 12. However, the light control device 10 is not limited to this but may be configured to present various other colors.

Second Embodiment

Figure 3:
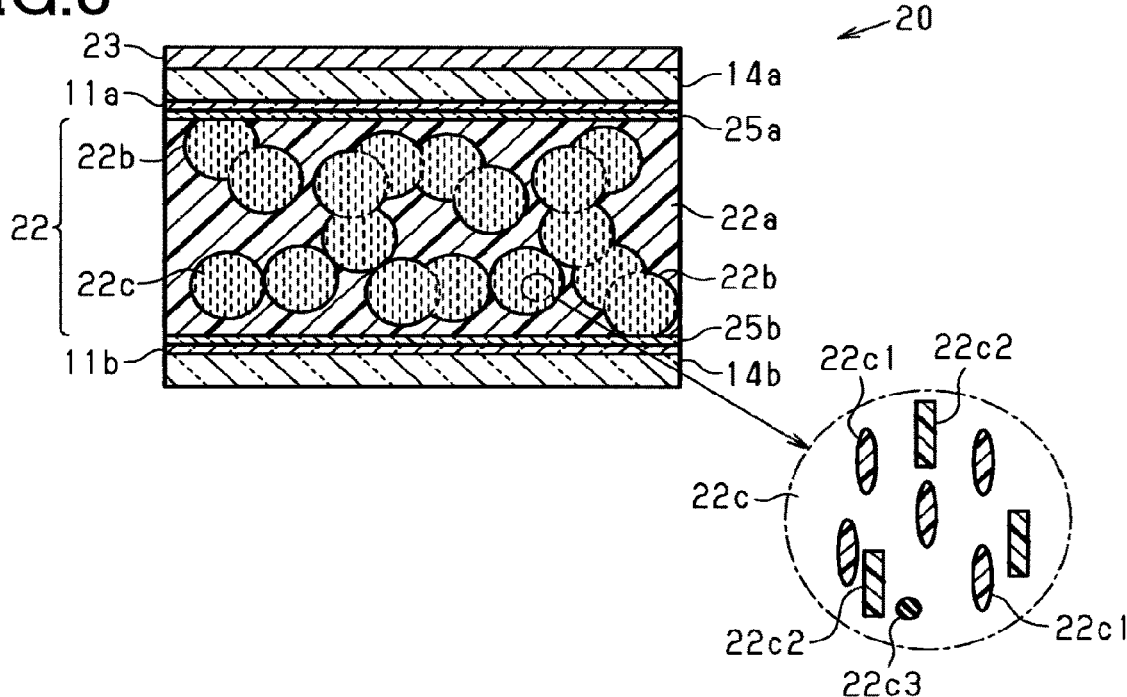
FIG. 3 is a schematic cross-sectional view illustrating a configuration of a light control device when no driving voltage is applied to the device, according to a second embodiment.
Figure 4:
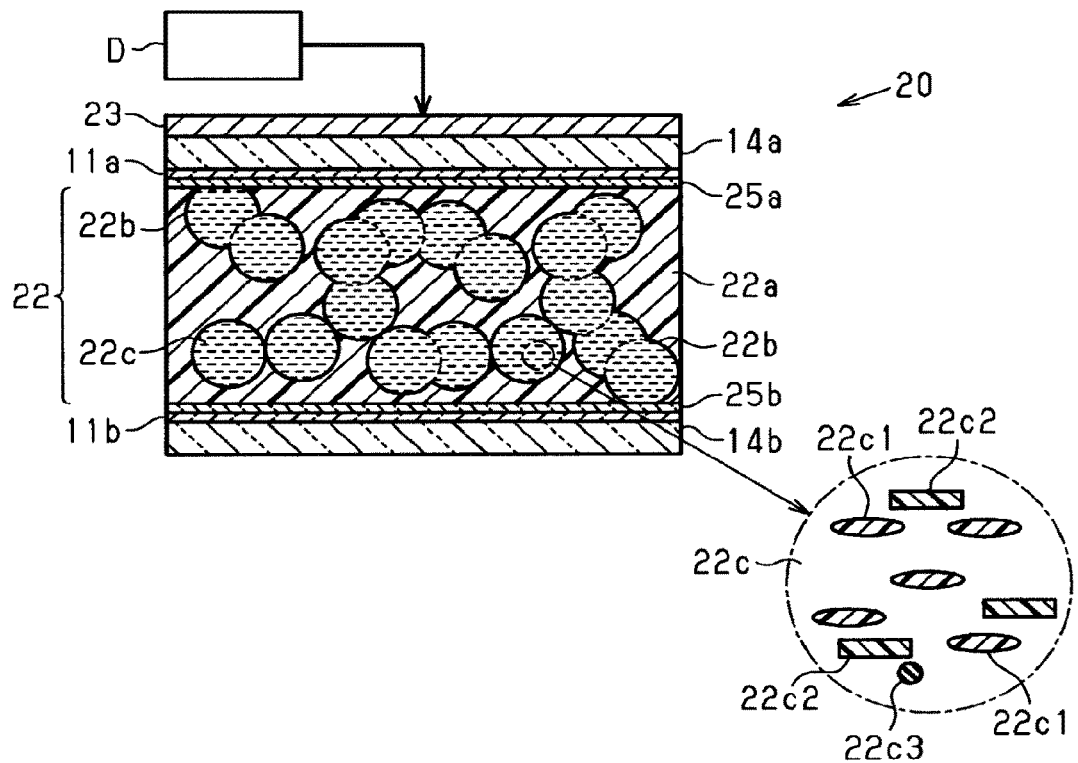
FIG. 4 is a schematic cross-sectional view illustrating a configuration of the light control device when a driving voltage is applied to the device, according to the second embodiment.

Referring to FIGS. 3 and 4, a second embodiment of a light control device will be described. The light control device of the second embodiment is different from the light control device 10 of the first embodiment in the formulation of the liquid crystal composition contained in the light control layer, and the orientation of the liquid crystal molecules In the following description, these differences are specifically explained. The components common to those of the first embodiment are designated with the same reference signs to omit specific explanation. In the following description, configuration and advantageous effects of the light control device will be sequentially explained. In FIGS. 3 and 4, as in FIGS. 1 and 2 previously referred to, domains contained in the light control layer are exaggerated for ease of explaining the configuration of the light control layer.

(Configuration of the Light Control Device)

Referring to FIG. 3, a configuration of the light control device will be described.

As shown in FIG. 3, a light control device 20 includes a first transparent electrode 11a, a second transparent electrode 11b, a light control layer 22 and one polarizing layer 23. The light control layer 22 is sandwiched between the first and second transparent electrodes 11a and 11b. The light control layer 22 contains a polymer network 22a and a plurality of domains 22b dispersed in the polymer network 22a. Each domain 22b is filled with a liquid crystal composition 22c that contains liquid crystal molecules 22c1 and a dichroic dye 22c2. The dichroic dye 22c2 is preferred to have good miscibility with the liquid crystal molecules 22c1 in the liquid crystal composition 22c.

The liquid crystal composition 22c is formulated such that the absorption axis of the dichroic dye 22c2 intersects that of the polarizing layer 23 due to change in orientation of the liquid crystal molecules 22c1 into a horizontal orientation as a result of applying a driving voltage to the light control layer 22. Specifically, the initial orientation of the liquid crystal molecules 22c1 contained in the liquid crystal composition 22c is an orientation other than a horizontal orientation, but is changed to a horizontal orientation by application of a driving voltage to the light control layer 22. The initial orientation of the liquid crystal molecules 22c1 is a vertical orientation or a hybrid orientation. Irrespective of whether a driving voltage is applied to the light control layer 22 or not, the dichroic dye 22c2 contained in the liquid crystal composition 22c is in an orientation that is the same as that of the liquid crystal molecules 22c1. Specifically, the orientation of the dichroic dye 22c2 changes, together with the orientation of the liquid crystal molecules 22c1, to a horizontal orientation from an orientation other than the horizontal orientation by application of a driving voltage to the light control layer 22.

The initial orientation, i.e., a vertical or hybrid orientation, of the liquid crystal molecules 22c1 filled in the domains 22b can be changed to a horizontal orientation by application of a driving voltage to the light control layer 22.

The light control device 20 further includes a first orientation layer 25a disposed between the first transparent electrode 11a and the light control layer 22, and a second orientation layer 25b disposed between the second transparent electrode 11b and the light control layer 22. Of the layers included in the light control device 20, those layers which are different from the layers included in the light control device 10 of the first embodiment will be more specifically described.

(Polarizing Layer)

Unlike the light control device 10 of the first embodiment, the light control device 20 includes only one polarizing layer 23. As viewed in the thickness direction of the light control device 20, the polarizing layer 23 has a transmission axis extending in one direction. As viewed in the thickness direction of the light control device 20, the polarizing layer 23 has an absorption axis extending in a direction perpendicular to the transmission axis. The polarizing layer 23 is configured such that, when a driving voltage is applied to the light control layer 22, the absorption axis of the polarizing layer 23 becomes perpendicular to the absorption axis of the dichroic dye 22c2, i.e., the direction in which the dichroic dye 22c2 extends, as viewed in the thickness direction of the light control device 20. Compared to the configuration that is not provided with the polarizing layer 23, the configuration of the light control device 20 provided with the polarizing layer 23 can reduce the amount of the dichroic dye 22c2 contained in the light control layer 22 if approximately the same brightness is to be achieved in a color, e.g., black color, between these two configurations.

(Orientation Layers)

The pair of orientation layers 25a and 25b have optical transparency transmitting visible light. Either of the following two examples can be selected for the pair of orientation layers 25a and 25b according to the initial orientation of the liquid crystal molecules 22c1. In a first example of the pair of orientation layers 25a and 25b, both of the first and second orientation layers 25a and 25b are vertical orientation layers. Specifically, the orientation layers 25a and 25b each have orientation regulation force orienting the liquid crystal molecules 22c1 such that the long axes of the liquid crystal molecules 22c1 become perpendicular to the plane where the orientation layer 25a or 25b extends. According to such a pair of orientation layers 25a and 25b, the initial orientation of the liquid crystal molecules 22c1 can be a vertical orientation. As viewed in the thickness direction of the light control device 20, the pair of orientation layers 25a and 25b each orient the liquid crystal molecules 22c1 such that each plane including the long axes of the liquid crystal molecules 22c1 becomes perpendicular to the plane including the absorption axis of the polarizing layer 23. It should be noted that the initial vertical orientation is regarded to be effective even if the direction of the long axes of the liquid crystal molecules 22c1 is inclined by several degrees relative to the vertical direction, as long as the inclination is in a range that is determined to be substantially vertical by those who are skilled in the art.

In a second example of the pair of orientation layers 25a and 25b, the first orientation layer 25a is a vertical orientation layer, while the second orientation layer 25b is a horizontal orientation layer. Specifically, the first orientation layer 25a has orientation regulation force orienting the long axis direction of the liquid crystal molecules 22c1 so as to be perpendicular to the plane in which the first orientation layer 25a extends. The second orientation layer 25b has orientation regulation force orienting the liquid crystal molecules 22c1 such that the direction in which the long axes of the liquid crystal molecules 22c1 extend becomes parallel to the plane in which the second orientation layer 25b extends.

According to such a pair of orientation layers 25a and 25b, the initial orientation of the liquid crystal molecules 22c1 can be a hybrid orientation. More specifically, in the initial orientation of the liquid crystal molecules 22c1, the inclination of these molecules relative to the plane in which the second orientation layer 25b extends gradually increases in a direction from the second orientation layer 25b toward the first orientation layer 25a. Thus, the orientation of the liquid crystal molecules 22c1 gradually changes from a horizontal orientation to a vertical orientation. In this way, the pair of orientation layers 25a and 25b allow the liquid crystal molecules 22c1 to orient such that the direction in which the long axes of the liquid crystal molecules 22c1 extend becomes perpendicular to the absorption axis of the polarizing layer 23 in the vicinity of the polarizing layer 23, as viewed in the thickness direction of the light control device 20.

(Liquid Crystal Composition)

The liquid crystal composition 22c contains the liquid crystal molecules 22c1 and the dichroic dye 22c2. The liquid crystal composition 22c may contain or may not contain an unreacted part of a UV-polymerizable compound 22c3 that has been used for forming the polymer network 22a.

When the initial orientation of the liquid crystal molecules 22c1 is a vertical orientation, the liquid crystal molecules 22c1 may be liquid crystal molecules which have both a negative dielectric anisotropy and a nematic liquid crystal phase. By using such liquid crystal molecules having both a negative dielectric anisotropy and a nematic liquid crystal phase as the liquid crystal molecules 22c1, the orientation of the liquid crystal molecules 22c1 is permitted to change from a vertical orientation to a horizontal orientation by application of a driving voltage to the light control layer 22.

Similarly, when the initial orientation of the liquid crystal molecules 22c1 is a hybrid orientation, the liquid crystal molecules 22c1 may be liquid crystal molecules which have both a negative dielectric anisotropy and a nematic liquid crystal phase. By using such liquid crystal molecules having both a negative dielectric anisotropy and a nematic liquid crystal phase as the liquid crystal molecules 22c1, the orientation of the liquid crystal molecules 22c1 is permitted to change from a hybrid orientation to a horizontal orientation by application of a driving voltage to the light control layer 22.

(Polymer Network)

The UV-polymerizable compound 22c3, which is a material forming the polymer network 22a, may be a compound containing the liquid crystal molecules in the UV-polymerizable compound 12c2 of the first embodiment, or an isotropic polymer.

In the liquid crystal polymer contained in the polymer network 22a, the orientation of a unit structure, i.e., the structure for the liquid crystal molecules before polymerization, for forming the polymer is fixed to the orientation determined by the orientation regulation force of the orientation layers 25a and 25b. Therefore, when the pair of orientation layers 25a and 25b are formed such that the liquid crystal molecules 22c1 filled in the domains 22b are vertically oriented, the orientation of a unit structure contained in the polymer network 22a, i.e., the orientation of the structure for the liquid crystal molecules, is fixed to a vertical orientation. When the pair of orientation layers 25a and 25b are formed such that the liquid crystal molecules 22c1 are oriented in a hybrid orientation, the unit structure contained in the polymer network 22a is fixed to a hybrid orientation.

(Dichroic Dye)

The dichroic dye 22c2 corresponds to dye molecules exhibiting anisotropy when absorbing visible light. The color of light that has passed through the light control layer 22 depends on the direction in which the long axis of the dichroic dye 22c2 extends, i.e., the direction in which the absorption axis extends. The dichroic dye 22c2 may contain only one dye or may contain several dyes. For example, when the light control device 20 is configured to present a black color during application of a driving voltage to the light control layer 22 and the dichroic dye 22c2 contains only one dye, the dichroic dye 22c2 may be a black dye, i.e., a dye that absorbs most of the light having a wavelength in the wavelength range of visible light. When the dichroic dye 22c2 contains several dyes, the several dyes may have absorption wavelength bands different from each other in the wavelength range of visible light.

The dichroic dye 22c2, when containing several dyes, may be formulated, for example, by mixing three dyes which are yellow, red and blue. Of the three dyes, the absorption wavelength band of the yellow dye includes a shortest-wavelength region, the absorption wavelength band of the blue dye includes a longest-wavelength region and the absorption wavelength band of the red dye includes a region residing between the absorption wavelength bands of other dyes. The absorption wavelength band of each dye may include part of the absorption wavelength bands of other dyes. For example, the dichroic dye 22c2 may be an azo dye, anthraquinone dye, naphthoquinone dye, or the like.

As in the light control layer 12 of the first embodiment, the light control layer 22 of the present embodiment is also preferred to have refractive index anisotropy of 0.1 or less during application of a driving voltage thereto. It is preferred that, during application of a driving voltage to the light control layer 22, i.e., during application of a driving voltage to the light control device 20, the refractive index of the polymer network 22a, the extraordinary refractive index of the liquid crystal molecules 22c1 and the ordinary refractive index of the liquid crystal molecules 22c1 have a maximum value and a minimum value having a difference of 0.16 or less therebetween.

When no driving voltage is applied to the light control layer 22 as well, $\Delta n$, i.e., a value obtained by subtracting the ordinary refractive index $n_o$ from the extraordinary refractive index $n_e$, is preferred to be 0.16 or less as mentioned above. As mentioned above, if $\Delta n$ is more than 0.16, the extraordinary refractive index $n_e$ becomes higher compared to the case of $\Delta n$ being 0.16 or less. Therefore, when the light control device 20 is observed obliquely, the difference in refractive index between the polymer network 22a and the liquid crystal molecules 22c1 increases even more. Thus, when no driving voltage is applied to the light control layer 22, transmittance according to the viewing angle variation for observing the light control device 20 decreases even more. From this viewpoint, $\Delta n$ is preferred to be 0.16 or less.

(Operation of the Light Control Device)

Referring to FIGS. 3 and 4, operation of the light control device 20 will be described The following description firstly explains a configuration in which the initial orientation of the liquid crystal molecules 22c1 is a vertical orientation and secondly explains a configuration in which the initial orientation of the liquid crystal molecules 22c1 is a hybrid orientation. As will be explained below, the light control device 20 is a reverse-mode light control device which is transparent when no driving voltage is applied to the light control layer 22 but is opaque when a driving voltage is applied thereto.

As shown in FIG. 3, in a configuration in which the initial orientation is a vertical orientation, when no driving voltage is applied to the light control layer 22, the liquid crystal molecules 22c1 contained in the liquid crystal composition 22c and the liquid crystal polymer in the polymer network 22a are both in a vertical orientation. In this case, the orientation of the dichroic dye 22c2 is also a vertical orientation. Therefore, for example, light incident on the light control device 20 from the second transparent substrate 14b emerges from the light control device 20 via the polarizing layer 23. Thus, when no driving voltage is applied to the light control layer 22, the light control device 20 is transparent.

As shown in FIG. 4, when the drive section D applies a driving voltage to the light control layer 22 via the pair of transparent electrodes, the orientation of the liquid crystal molecules 22c1 changes from the vertical orientation to a horizontal orientation. In this case, the orientation of the dichroic dye 22c2 is also a horizontal orientation. Moreover, as viewed in the thickness direction of the light control device 20, the absorption axis of the dichroic dye 22c2 is perpendicular to that of the polarizing layer 23. Thus, the light control device 20 presents a black color, for example, because part of light incident on the second transparent substrate 14b is absorbed by the dichroic dye 22c2, and light that has not been absorbed by the dichroic dye 22c2 does not pass through the polarizing layer 23. In this way, in the light control device 20, the absorption axis of the polarizing layer 23 becomes perpendicular to that of the dichroic dye 22c2 when a driving voltage is applied to the light control layer 22. Therefore, light incident on the light control device 20 does not emerge from the light control device 20. Accordingly, vividness of the black color is enhanced in the light control device 20.

As shown in FIGS. 3 and 4, when no driving voltage is applied to the light control layer 22 in a configuration in which the initial orientation is a hybrid orientation, the orientation of the liquid crystal molecules 22c1 contained in the liquid crystal composition 22c and the liquid crystal polymer in the polymer network 22a and the orientation of the dichroic dye 22c2 are both a hybrid orientation. Therefore, for example, light incident on the light control device 20 from the second transparent substrate 14b emerges from the light control device 20 via the polarizing layer 23. Consequently, the light control device 20 is transparent. In contrast, the orientation of the liquid crystal molecules 22c1 and the orientation of the dichroic dye 22c2 change to a horizontal orientation by application of a driving voltage to the light control layer 22. Therefore, the light control device 20 presents, for example, a black color as in the configuration in which the initial orientation is a vertical orientation.

As described above, the second embodiment of the light control device can not only achieve the advantageous effects of Items (2), (5) and (6) provided above but also the advantageous effects provided below.

(7) In the light control device 20, the absorption axis of the polarizing layer 23 becomes perpendicular to that of the dichroic dye 22c2 by application of a driving voltage to the light control layer 22. Therefore, light incident on the light control device 20 does not emerge from the light control device 20. Therefore, transmittance can be effectively lowered. In addition, vividness of the color presented by the dichroic dye in the light control device 20 is enhanced. Furthermore, transmittance can be controlled over a greater range between when no driving voltage is applied to the light control layer 22 and when a driving voltage is applied thereto.

(8) The initial orientation, i.e., a vertical or hybrid orientation, of the liquid crystal molecules 22c1 filled in the domains 22b can be changed to a horizontal orientation by application of a driving voltage to the light control layer 22.

The second embodiment described above may be appropriately modified and implemented as follows.

When the dichroic dye 22c2 is horizontally oriented together with the liquid crystal molecules 22c1, the absorption axis of the dichroic dye 22c2 and that of the polarizing layer 23 may intersect at an angle other than a right angle as viewed in the thickness direction of the light control device 20. With this configuration as well, at least part of light absorbed by the dichroic dye 22c2 cannot pass through the polarizing layer 23. Accordingly, the advantageous effects of Item (7) provided above can be substantially achieved.

In the above embodiment, the light control device 20 is explained as presenting a black color when a driving voltage is applied to the light control layer 22. However, the light control device 20 is not limited to this but may be configured to present various other colors. For example, a dichroic dye may be formulated by adjusting the component of the dichroic dye used in the second embodiment to provide a configuration in which blue or red is presented.

The present application addresses the following. Reverse-mode light control devices have lower reliability in the opaque state than do normal-mode light control devices, and thus are required to be improved even more. In other words, the opaque state needs to be emphasized more in the reverse-mode light control devices.

The present invention has an aspect to provide a light control device, in particular a reverse-mode light control device, which is capable of performing control over greater transmittance range to make the opaque state more distinct when a driving voltage is applied to the device.

A light control device includes: a first transparent electrode; a second transparent electrode; a light control layer sandwiched between the first and second transparent electrodes and containing a polymer network and a plurality of domains dispersed in the polymer network, the plurality of domains being filled with a liquid crystal composition; and a pair of polarizing layers sandwiching the light control layer and arranged in a crossed Nicols relationship. The liquid crystal composition contains liquid crystal molecules whose orientation changes to a vertical orientation by application of a driving voltage to the light control layer.

According to the above configuration, when a driving voltage is applied to the light control layer, the vertically oriented liquid crystal molecules are sandwiched between the two polarizing layers that are arranged in a crossed Nicols relationship. Therefore, light incident on the light control layer via one polarizing layer does not emerge from the other polarizing layer. Therefore, transmittance can be effectively lowered when a driving voltage is applied to the light control layer. Furthermore, transmittance can be controlled over a greater range between when no driving voltage is applied to the light control layer and when a driving voltage is applied thereto.

In the above light control device, the liquid crystal molecules may be in a horizontal orientation when no driving voltage is applied to the light control layer.

In the above light control device, the liquid crystal molecules may be in a twisted orientation when no driving voltage is applied to the light control layer.

According to the above configuration, the orientation being horizontal or twisted when no driving voltage is applied to the light control layer can minimize scattering of light in the light control layer, resultantly lowering turbidity of the light control device.

Another aspect of a light control device for solving the above problem includes: a first transparent electrode; a second transparent electrode; a light control layer sandwiched between the first and second transparent electrodes and containing a polymer network and a plurality of domains dispersed in the polymer network, the plurality of domains being filled with a liquid crystal composition; and one polarizing layer. The liquid crystal composition contains liquid crystal molecules and a dichroic dye. The liquid crystal molecules change an orientation thereof to a horizontal orientation by application of a driving voltage to the light control layer. The change to a horizontal orientation allows an absorption axis of the dichroic dye to intersect an absorption axis of the polarizing layer.

According to the above configuration, the absorption axis of the polarizing layer intersects that of the dichroic dye by application of a driving voltage to the light control layer. Therefore, at least part of light incident on the light control device does not emerge from the light control device. Therefore, transmittance can be effectively lowered. In addition, vividness of the color presented by the dichroic dye in the light control device is enhanced. Furthermore, transmittance can be controlled over a greater range between when no driving voltage is applied to the light control layer and when a driving voltage is applied thereto.

In the above light control device, the liquid crystal molecules may be in a vertical orientation when no driving voltage is applied to the light control layer.

In the above light control device, the liquid crystal molecules may be in a hybrid orientation when no driving voltage is applied to the light control layer.

According to the above configuration, the orientation being vertical or hybrid when no driving voltage is applied to the light control layer can minimize scattering of light in the light control layer, resultantly lowering turbidity of the light control device.

In the above light control device, the polymer network may contain a liquid crystal polymer.

According to the above configuration, when the liquid crystal molecules are in an orientation that is an orientation before application of a driving voltage to the liquid crystal layer, the orientation of the liquid crystal molecules becomes equal to that of the liquid crystal polymer. Therefore, light scattering is minimized in the light control layer. As a result, turbidity of the light control device is lowered.

In the above light control device, the polymer network may contain an optically isotropic liquid crystal polymer.

According to the above configuration, the polymer has no anisotropy in refractive index. Therefore, if there is a change in orientation before and after application of a driving voltage, the refractive indices of the liquid crystal molecules and the polymer are both prevented from excessively increasing.

In the above light control device, a difference between a maximum refractive index and a minimum refractive index may be 0.16 or less among a refractive index of the polymer network, an extraordinary refractive index of the liquid crystal molecules and an ordinary refractive index of the liquid crystal molecules.

According to the above configuration, light scattering in the light control layer is minimized, resultantly enhancing vividness of the color presented by the light control device.

The present invention has an aspect to provide a light control device which is capable of performing control over a greater transmittance range to make the opaque state more distinct when a driving voltage is applied to the device.

REFERENCE SIGNS LIST 10, 20 . . . Light control device
11a . . . First transparent electrode
11b . . . Second transparent electrode
12, 22 . . . Light control layer
12a, 22a . . . Polymer network
12b, 22b . . . Domain
12c, 22c . . . Liquid crystal composition
12c1, 22c1 . . . Liquid crystal molecule
12c2, 22c3 . . . UV-polymerizable compound
13a . . . First polarizing layer
13b . . . Second polarizing layer
14a . . . First transparent substrate
14b . . . Second transparent substrate
15a, 25a . . . First orientation layer
15b, 25b . . . Second orientation layer
22c2 . . . Dichroic dye
23 . . . Polarizing layer
D . . . Drive section Obviously, numerous modifications and variations of the present invention are possible in light of the above teachings. It is therefore to be understood that within the scope of the appended claims, the invention may be practiced otherwise than as specifically described herein.

What is claimed is:

1. A light control device, comprising:
a first transparent electrode;
a second transparent electrode;
a light control layer sandwiched vertically between the first transparent electrode and the second transparent electrode;
a first orientation layer formed on a first surface of the light control layer and positioned between the first transparent electrode and the light control layer;
a second orientation layer formed on a second surface of the light control layer and positioned between the second transparent electrode and the light control layer; and
a pair of polarizing layers sandwiching the light control layer and positioned in a crossed Nicols relationship,
wherein the light control layer includes a polymer network and a liquid crystal composition forming a plurality of domains in the polymer network such that at least one of the domains is in contact with at least one of the first and second orientation layers and that the liquid crystal composition includes a plurality of liquid crystal molecules that change to a vertical orientation upon application of a driving voltage to the light control layer, the plurality of domains is dispersed in the polymer network such that the plurality of domains are connected each other through adjacent ones of the domains and that the liquid crystal composition is continuous through the plurality of domains, and the light control layer is formed such that the liquid crystal composition is in a form of the plurality of domains having an average domain diameter in a range of 0.1 µm to 5 µm.

2. The light control device according to claim 1, wherein the liquid crystal molecules in the light control layer without application of the driving voltage have a horizontal orientation perpendicular to the vertical orientation.

3. The light control device according to claim 1, wherein the liquid crystal molecules in the light control layer without application of the driving voltage have a twisted orientation.

4. A light control device, comprising:
a first transparent electrode;
a second transparent electrode;
a polarizing layer formed on one of the first and second transparent electrodes;
a light control layer sandwiched in a vertical direction between the first transparent electrode and the second transparent electrode; a first orientation layer formed on a first surface of the light control layer and positioned between the first transparent electrode and the light control layer;
a second orientation layer formed on a second surface of the light control layer and positioned between the second transparent electrode and the light control layer,
wherein the light control layer includes a polymer network and a liquid crystal composition forming a plurality of domains in the polymer network such that at least one of the domains is in contact with at least one of the first and second orientation layers and that the liquid crystal composition includes a plurality of liquid crystal molecules and a dichroic dye, the liquid crystal molecules have an orientation that changes to a horizontal orientation perpendicular to the vertical direction upon application of a driving voltage to the light control layer such that an absorption axis of the dichroic dye intersects with an absorption axis of the polarizing layer, the plurality of domains is dispersed in the polymer network such that the plurality of domains are connected each other through adjacent ones of the domains and that the liquid crystal composition is continuous through the plurality of domains, and the light control layer is formed such that the liquid crystal composition is in a form of the plurality of domains having an average domain diameter in a range of 0.1 µm to 5 µm.

5. The light control device according to claim 4, wherein the liquid crystal molecules in the light control layer without application of the driving voltage have a vertical orientation parallel to the vertical direction.

6. The light control device according to claim 4, wherein the liquid crystal molecules in the light control layer without application of the driving voltage have a hybrid orientation.

7. The light control device according to claim 1, wherein the polymer network includes a liquid crystal polymer.

8. The light control device according to claim 2, wherein the polymer network includes a liquid crystal polymer.

9. The light control device according to claim 3, wherein the polymer network includes a liquid crystal polymer.

10. The light control device according to claim 1, wherein the polymer network includes an optically isotropic liquid crystal polymer.

11. The light control device according to claim 2, wherein the polymer network includes an optically isotropic liquid crystal polymer.

12. The light control device according to claim 3, wherein the polymer network includes an optically isotropic liquid crystal polymer.

13. The light control device according to claim 1, wherein a difference between a maximum refractive index and a minimum refractive index is 0.16 or less among a refractive index of the polymer network, an extraordinary refractive index of the liquid crystal molecules and an ordinary refractive index of the liquid crystal molecules.

14. The light control device according to claim 2, wherein a difference between a maximum refractive index and a minimum refractive index is 0.16 or less among a refractive index of the polymer network, an extraordinary refractive index of the liquid crystal molecules and an ordinary refractive index of the liquid crystal molecules.

15. The light control device according to claim 3, wherein a difference between a maximum refractive index and a minimum refractive index is 0.16 or less among a refractive index of the polymer network, an extraordinary refractive index of the liquid crystal molecules and an ordinary refractive index of the liquid crystal molecules.

16. The light control device according to claim 1, further comprising:
a first transparent substrate positioned between the first transparent electrode and one of the pair of polarizing layers; and
a second transparent substrate positioned between the second transparent electrode and the other one of the pair of polarizing layers.

17. A light control device, comprising:
a first transparent electrode;
a second transparent electrode;
a light control layer sandwiched vertically between the first transparent electrode and the second transparent electrode;
a first orientation layer formed on a first surface of the light control layer and positioned between the first transparent electrode and the light control layer;
a second orientation layer formed on a second surface of the light control layer and positioned between the second transparent electrode and the light control layer; and
a pair of polarizing layers sandwiching the light control layer and positioned in a crossed Nicols relationship,
wherein the light control layer includes a polymer network and a liquid crystal composition forming a plurality of domains in the polymer network such that at least one of the domains is in contact with at least one of the first and second orientation layers and that the liquid crystal composition includes a plurality of liquid crystal molecules that change to a vertical orientation upon application of a driving voltage to the light control layer, and the plurality of domains is dispersed in the polymer network such that the plurality of domains are connected each other through adjacent ones of the domains and that the liquid crystal composition is continuous through the plurality of domains, and the light control layer is formed such that a thickness of the light control layer satisfies $m\lambda = \Delta nd = (n_e - n_o)d$ and $\lambda/2 = \Delta nd$, where m is an integer, $\lambda$ is a wavelength of light incident on the light control layer 12, $n_e$ is an extraordinary refractive index, $n_o$ is an ordinary refractive index, and d is the thickness of the light control layer.

18. The light control device according to claim 1, wherein the light control layer is formed such that the polymer network includes a liquid crystal polymer and that the light control layer satisfies $\Delta ndr \leq 0.25$, where $\Delta n$ is a refractive index difference of the liquid crystal polymer, d is a thickness of the light control layer, and r is a ratio of the liquid crystal molecules.

19. A light control device, comprising:
a first transparent electrode;
a second transparent electrode;
a light control layer sandwiched vertically between the first transparent electrode and the second transparent electrode;
a first orientation layer formed on a first surface of the light control layer and positioned between the first transparent electrode and the light control layer;
a second orientation layer formed on a second surface of the light control layer and positioned between the second transparent electrode and the light control layer; and
a pair of polarizing layers sandwiching the light control layer and positioned in a crossed Nicols relationship,
wherein the light control layer includes a polymer network and a liquid crystal composition forming a plurality of domains in the polymer network such that at least one of the domains is in contact with at least one of the first and second orientation layers and that the liquid crystal composition includes a plurality of liquid crystal molecules that change to a vertical orientation upon application of a driving voltage to the light control layer, and the plurality of domains is dispersed in the polymer network such that the plurality of domains are connected each other through adjacent ones of the domains and that the liquid crystal composition is continuous through the plurality of domains, and the light control layer is formed such that the polymer network includes a liquid crystal polymer, and that a difference between a maximum refractive index and a minimum refractive index is 0.16 or less among a refractive index of the polymer network, an extraordinary refractive index of the liquid crystal molecules and an ordinary refractive index of the liquid crystal molecules.

20. The light control device according to claim 1, wherein the light control layer is formed such that the liquid crystal composition is in a form of the plurality of domains having an average domain diameter in a range of 0.2 μm to 3 μm.

* * * * *